Nov. 10, 1959  H. D. TAYLOR  2,912,157
CAMBERED SHROUD
Filed May 10, 1957

INVENTOR
HARLAN D. TAYLOR
BY
ATTORNEY

United States Patent Office 2,912,157
Patented Nov. 10, 1959

2,912,157

CAMBERED SHROUD

Harlan D. Taylor, Manchester, Conn., assignor to United Aircraft Corporation, East Hartford, Conn., a corporation of Delaware Application May 10, 1957, Serial No. 658,394

8 Claims. (Cl. 230—134)

This invention relates to turbomachinery and more particularly to shrouds for the blading of turbomachines.

It is an object of this invention to provide a shroud for the blading of axial flow turbomachines in order to increase the stiffness of the blading.

It is a further object of this invention to camber or droop the leading and trailing edges of the shroud so that it presents a contour corresponding closely to the flow in the relative airstream between the blading to thereby reduce profile drag losses and increase performance.

It is a still further object of this invention to provide a shroud which has a specifically defined contour or profile to provide the maximum reduction in profile drag.

These and other objects of this invention will become readily apparent from the following detailed description of the drawing in which.

Where shrouds are utilized in turbomachinery such as compressors and turbines, the stream lines flowing between the blades and over the shroud are not necessarily such that a symmetrically shaped shroud produces the least resistance. It is therefore the primary purpose of this invention to define a shroud for turbomachinery, which shroud has a specifically defined cross section with a camber and being unsymmetrical in cross section so as to reduce to a minimum the profile drag loss.

As used in this description, the word "turbomachinery" may include either the rows of rotor blades or stator blades of a compressor or the rotor blades or stator blades of a turbine in an axial flow device.

Figure 1:
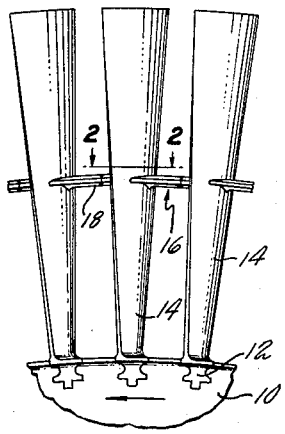
Fig. 1 illustrates a section of an end view of an axial flow compressor or similar turbomachine.

Referring to Fig. 1, by example, a portion of a compressor is illustrated as having a rotor 10 which receives the roots 12 of compressor blades such as 14. A rotor 10 will have an axis of rotation and the blades 14 extend radially from said axis and are normally rotated about the axis to perform work on the air or similar fluid passing therethrough. In order to increase the stiffness of the compressor blading an annular shroud 16 is provided and this shroud comprises a plurality of elements such as 18 which span the space between adjacent blades. The element 18 is similar to elements 20 and 22. The shroud 16 is located radially outward about 50% of the radial extent of the blades 14 from the axis of rotation. The exact radial location of the shroud is chosen to provide a maximum amount of stiffness with the least amount of drag and weight. This may be varied somewhat in order to provide a maximum amount of stiffness with the least amount of drag and weight. It is of course obvious that the farther out that the shroud is located, the larger will be its weight and size due to the increase in diameter.

Figure 2:
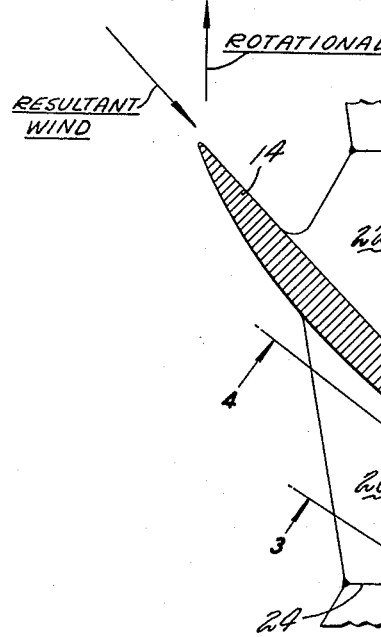
Fig. 2 is a section taken along the line 2—2 of Fig. 1 (and rotated 90°) illustrating a portion of the shroud elements in plan view.
Figure 3:
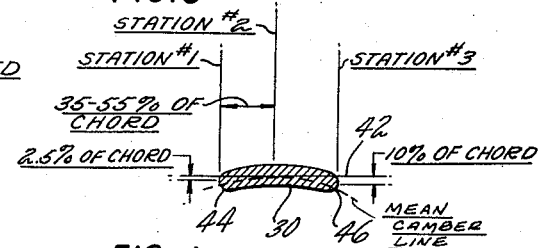
Fig. 3 is taken along the line 3—3 of Fig. 2.
Figure 4:
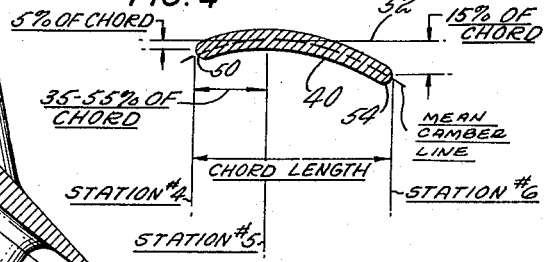
Fig. 4 is taken along the line 4—4 of Fig. 2.

As seen in Fig. 2 one of the blades 14 is illustrated in section. Each of these blades carries on either side thereof a portion 20 of the shroud members or elements 18 which span the space between adjacent blades. Each of these blades may carry a shroud portion 20 and 22 on either side thereof and these may be suitably connected as, for example, by welding along a line such as shown at 24. Thus, when the connection is made at 24 and similar lines in each of the spaces between the blades 14, a substantially solid shroud is provided to increase the blade over-all stiffness. The portion 20 of the shroud members has a curvature or a camber which is fairly high immediately adjacent the blade 14 and decreases somewhat in a direction away from the blade 14 across the space between adjacent blades. Thus, for example, as shown in Figs. 3 and 4, the sections taken along the portion 20 are designated as 30 and 40, respectively. It is apparent that out along the span of the portion 20, that is, away from the blade 14 the camber of the section 30 is less than the camber of the section 40.

It has been determined that this camber can be ideally defined by reference to the various stations chordwise of these cambered sections. The aerodynamic drag of the shroud sections is primarily a function of the shape of the mean camber line. The mean camber line is considered to be the locus of points situated half way between the upper and lower surfaces of the section, these distances being measured normal to the mean line. It has been determined that this camber can be ideally defined by the use of a reference line (42 and 52) which, for an uncambered section is identical to the mean camber line. In Fig. 3 at station 1 the ordinate or vertical distance of the mean camber line with respect to the reference line is approximately 2.5 percent of the chord of the section 30. At station 2, which is intermediate the leading and trailing edges of the section, the ordinate of the mean camber line is approximately 0, that is, substantially tangent to the reference line 42. The location, in the direction of the chord, of this region where the mean camber lines and the reference line is substantially tangent is in the range of 35 percent to 55 percent of the chordwise dimension of the section 30 measured from the leading edge 44. At the trailing edge station 3 the ordinate of the mean camber line with respect to the reference line 42 is approximately 10 percent of the chordwise dimension of the section 30. It should be noted that the departures of the mean camber line from the reference line 42 of the leading edge 44 and the trailing edge 46 are in the same direction; i.e., both downward, i.e., a convex surface is seen when the shroud is viewed from the outer extremities of the blades.

Similarly in Fig. 4 the section 40 has at station 4 a leading edge 50 which departs from a reference line 52 an amount approximately equal to 5% of the chordwise dimension of the section 40. At station 5 the section 40 is substantially tangent in camber to the reference line 50 or, in other words, is at a zero camber. The location of station 5 is in the range of 35% to 55% of the chordwise dimension of the blade section 40. At station 6 the trailing edge 54 departs from the reference line 52 an amount approximately equal to 15% of the chordwise dimension of the section 40.

It is of course intended that the mean camber line of shroud sections between sections taken along the lines 3—3 and 4—4 would be determined from a linear interpolation of a graphical representation of mean camber as a function of the physical distance between sections taken along the lines 3—3 and 4—4. This method of obtaining the sections also results in straight leading and trailing edges between the two sections 3—3 and 4—4.

As a result this invention it is apparent that a contoured or cambered shroud has been provided for turbomachinery such as compressors whereby the profile drag of the shroud is greatly reduced thereby increasing the performance of the compressor.

Although only one embodiment of this invention has been illustrated and described herein, it will become apparent that various changes and modifications may be made in the construction and arrangement of the various parts without departing from the scope of this novel concept.

What it is desired by Letters Patent is:

1. In a turbomachine comprising a blade row having a longitudinal axis, said row including a plurality of blades radially extending relative to said axis, shroud means comprising a plurality of members spanning the spaces between said blades, said shroud being annular and being located along the span of said blades intermediate the inner and outer ends of said blades, and means for reducing the profile drag of said shroud comprising a portion streamlined in a fore and aft direction and forming a part of each of said members, said streamlined portion being cambered with the leading and trailing edges of said portion being spaced from a reference line which is parallel to said axis, the spacing of said leading and trailing edges from the reference line being in the same direction.

2. In a turbomachine according to claim 1 wherein the spacing of said trailing edge is greater than the spacing of said leading edge and the spacings are in a direction toward said axis.

3. In an axial flow compressor having at least one compressor stage comprising a row of blades having a longitudinal axis of rotation, said row having a plurality of circumferentially distributed blades extending radially in said row to move the air along the axis of said row, shroud members spanning the space between adjacent blades thereby together forming an annular shroud supporting the blades against vibration, each of said shroud members having a substantially streamlined first cross section having a chord and being located at a spanwise station of said member adjacent said blades which first cross section is defined by a leading edge which is spaced from a reference line which is parallel to said axis, said leading edge being spaced by a distance of approximately 5% of the chord of said first section, and a trailing edge which is spaced from said line a distance of approximately 15% of the chord of said first section.

4. In an axial flow compressor having at least one compressor stage comprising a row of blades having an axis of rotation, said row having a plurality of circumferentially distributed blades extending radially in said row to move the air along the axis of said row, shroud members spanning the space between adjacent blades thereby together forming an annular shroud supporting the blades against vibration, each of said shroud members having a first cross section having a chord and being located at a spanwise station of said member adjacent said blades which cross section is defined by a leading edge which is spaced from a reference line which is parallel to said axis, said leading edge being spaced by a distance of approximately 5% of the chord of said first cross section, a trailing edge which is spaced from said line a distance of approximately 15% of the chord of said section, and a portion intermediate said edges which has a mean camber line which is substantially parallel to said line and located in the range between 35% and 55% of the chord measured from the leading edge of the section.

5. In an axial flow compressor having at least one compressor stage comprising a row of blades having an axis of rotation, said row having a plurality of circumferentially distributed blades extending radially in said row to move the air along said axis, shroud members spanning the space between adjacent blades thereby together forming an annular shroud supporting the blades against vibration, each of said shroud members having a first cambered cross section having a chord and being located at a spanwise station of each said member adjacent said blades which first cross section is defined by a leading edge which departs from a reference line which is parallel to said axis, said leading edge being spaced from said line a distance of approximately 5% of the chord of said first section, a trailing edge which is spaced from said line approximately 15% of the chord of said first section, a second section of said shroud members having a second cambered cross section including a chord and located at a spanwise station of said shroud members intermediate said blades, said second section being defined by a leading edge which is spaced from a second reference line which is parallel to said axis, said leading edge being spaced from said second line approximately 2.5% of the chord of said second section, and a trailing edge which is spaced from said second line approximately 10% of the chord of said second section.

6. In an axial flow compressor having at least one compressor stage comprising a row of blades having an axis of rotation, said row having a plurality of circumferentially distributed blades extending radially in said row to move the air along said axis, shroud members spanning the space between adjacent blades thereby together forming an annular shroud supporting the blades against vibration, said shroud being located approximately halfway out spanwise from the inner ends of said blades, each of said shroud members having a first cambered cross section including a chord and being located at a spanwise station of each said member adjacent said blades which cross section is defined by a leading edge which is spaced from a reference line running parallel to said axis, said leading edge being so spaced a distance approximately 5% of the chord of said first section, a trailing edge which is spaced from said line approximately 15% of the chord of said section, and a portion intermediate said edges which is parallel to said line and located in the range between 35% and 55% of the chord of said first section measured from the leading edge of the section, a second cambered section of said shroud members having a second cross section including a chord and located at a spanwise station of said shroud members intermediate said blades but spanwise out from said first station, said second section being defined by a leading edge which is spaced from a second reference line running parallel to said axis, said leading edge being so spaced a distance approximately 2.5% of the chord of said second section, a trailing edge which is spaced from said second line approximately 10% of the chord of said second section, and a portion intermediate said edges which is parallel to said second line and located in the range between 35% and 55% of the chord measured from the leading edge of said second section.

7. In a turbomachine having a longitudinal axis and a plurality of blades radially extending from said axis and being circumferentially spaced about said axis, an annular shroud for said blades located intermediate the inner and outer ends of said blades, said shroud including a plurality of members spanning the space between adjacent blades, each of said members being streamlined in shape in a fore and aft direction relative to the fluid stream and having leading and trailing edges which have a curvature or spacing from a straight chordwise reference line running parallel to said axis, said curvature or spacing being relatively large adjacent one of said blades and decreasing toward a mid span station of each of said members, said curvature or spacing from said reference line being at a minimum at the mid span station and thereafter increasing again into a maximum in a direction toward the next adjacent blade.

8. In a turbomachine having a longitudinal axis and a plurality of blades radially extending from said axis and being circumferentially spaced about said axis, an annular shroud for said blades located intermediate the inner and outer ends of said blades, said shroud including a plurality of members spanning the space between adjacent blades, each of said members being streamlined in shape in a fore and aft direction relative to the fluid stream and having leading and trailing edges which have a curvature or spacing in the same relative direction from a straight chordwise reference line running parallel to said axis, the curvature of said trailing edge being greater than the curvature of said leading edge, the leading edge and trailing edge curvature or spacing being relatively large adjacent one of said blades and decreasing toward a mid span station of each of said members, said curvature or spacing from said reference line being at a minimum at the mid span station and thereafter increasing again into a maximum at the next adjacent blade.

References Cited in the file of this patent

UNITED STATES PATENTS

| | | |
|---|---|---|
| 1,301,705 | Junggren | Apr. 22, 1919 |
| 2,082,914 | Soderberg | June 8, 1937 |
| 2,472,886 | Conrad | June 14, 1949 |
| 2,724,544 | Hardigg | Nov. 22, 1955 |

FOREIGN PATENTS

| | | |
|---|---|---|
| 1,033,197 | France | Apr. 1, 1953 |